United States Patent
Guerra

(10) Patent No.: US 7,171,824 B2
(45) Date of Patent: Feb. 6, 2007

(54) REVERSIBLE AIR-WATER ABSORPTION HEAT PUMP

(75) Inventor: Marco Guerra, Bergamo (IT)

(73) Assignee: Robur S.p.A., Verdellino/Zingonia (IT)

( * ) Notice: Subject to any disclaimer, the term of this patent is extended or adjusted under 35 U.S.C. 154(b) by 92 days.

(21) Appl. No.: 10/532,485

(22) PCT Filed: Dec. 16, 2002

(86) PCT No.: PCT/IT02/00793

§ 371 (c)(1),
(2), (4) Date: Apr. 22, 2005

(87) PCT Pub. No.: WO2004/040207

PCT Pub. Date: May 13, 2004

(65) Prior Publication Data

US 2005/0268637 A1    Dec. 8, 2005

(30) Foreign Application Priority Data

Oct. 30, 2002  (IT)  ............................ MI2002A2309

(51) Int. Cl.
   *F25B 15/00*  (2006.01)
(52) U.S. Cl. .................... 62/476; 62/101; 62/324.2
(58) Field of Classification Search ................. 62/101, 62/476, 484, 489, 494, 324.2
   See application file for complete search history.

(56) References Cited

U.S. PATENT DOCUMENTS

| 3,527,060 | A | | 9/1970 | Kruggel |
| 3,693,661 | A | | 9/1972 | Aurenge et al. |
| 4,055,964 | A | * | 11/1977 | Swenson et al. ............ 62/238.4 |
| 4,085,596 | A | * | 4/1978 | Miyamoto et al. ............ 62/476 |
| 4,183,228 | A | * | 1/1980 | Saito et al. .................. 62/497 |
| 4,411,140 | A | * | 10/1983 | Katsumata et al. ......... 62/324.2 |
| 4,437,321 | A | | 3/1984 | Asai |
| 5,174,129 | A | | 12/1992 | Kondo |
| 6,584,801 | B2 | * | 7/2003 | Erickson ...................... 62/476 |
| 6,813,900 | B2 | * | 11/2004 | Sarkisian et al. .......... 62/324.2 |

FOREIGN PATENT DOCUMENTS

| EP | 0 911 597 | 4/1999 |
| GB | 2 233 428 | 1/1991 |
| WO | 01 50075 | 7/2001 |

* cited by examiner

*Primary Examiner*—Melvin Jones
(74) *Attorney, Agent, or Firm*—Oblon, Spivak, McClelland, Maier & Neustadt, P.C.

(57) ABSTRACT

A cooling or heating device in an absorption heat pump of GAX type, including a generator, a GAX heat exchanger, an absorber, a condenser, an evaporator, a pump connected to the absorber and generator, and a first circuit for refrigerant solution circulating through the device and connecting together at least the generator, GAX heat exchanger, absorber, condenser, evaporator, and pump. A valve device modifies the first circuit to vary the manner in which the absorber, condenser, and evaporator are connected together. At least first and second heat exchanger units enable at least one phase of the circulating solution to be changed and to enable thermal energy to be exchanged against an external fluid, the first and second heat exchanger units each including at least two mutually separate sub-heat exchangers configured to function either as an evaporator or as an absorber and condenser, depending on an operating mode of the device.

15 Claims, 4 Drawing Sheets

REVERSIBLE AIR-WATER ABSORPTION HEAT PUMP

The present invention relates to a cooling and/or heating device in an absorption heat pump of GAX type, in accordance with the pre-characterising part of the main claim.

Devices of the aforesaid type are described for example in U.S. Pat. No. 6,000,235, in U.S. Pat. No. 6,646,541 and in U.S. Pat. No. 4,719,767. The known devices comprise valve means for inverting the absorption cycle at the evaporator and condenser, so that those heat exchangers which during operation in heating mode act as the condenser and evaporator are arranged to act respectively as the evaporator and condenser during operation in cooling mode.

The devices of the aforedescribed type comprise at least two distinct and separate hydraulic circuits for dispersing the heat generated in the absorber, and in the means which function as evaporator during operation in cooling mode and as condenser during operation in heating mode (see for example U.S. Pat. No. 4,646,541). The presence of these two distinct hydraulic circuits for dispersing the heat considerably complicates the control and design both of the device overall and of the plant to which this device is connected.

Moreover in known devices the circuit through which the refrigerant solution passes and which connects together the various components of the device requires relatively complicated and costly valve and control means to ensure reliable passage of the device from one operating mode to the other; for example difficulties can arise because of the possible accumulation of solution and/or refrigerant within those circuit sections which are not in use, leading to uncertainties in the solution and refrigerant level within the circuit, to cause operating instability and substantial variations in efficiency.

An object of the present invention is to provide an absorption cooling and/or heating device of GAX type which is more compact and of easier operation and handling than traditional devices.

A further object is to provide a device which enables the hydraulic exchange circuit for the thermal energy generated or provided within the absorber and in the evaporator/condenser to the simplified.

A further object is to provide a device which enables the valve and control means present in the circuit for passage of the refrigerant solution to be simplified.

These and further objects which will be apparent to an expert of the art are attained by a device in accordance with the characterising part of the accompanying claims.

Figure 1A:
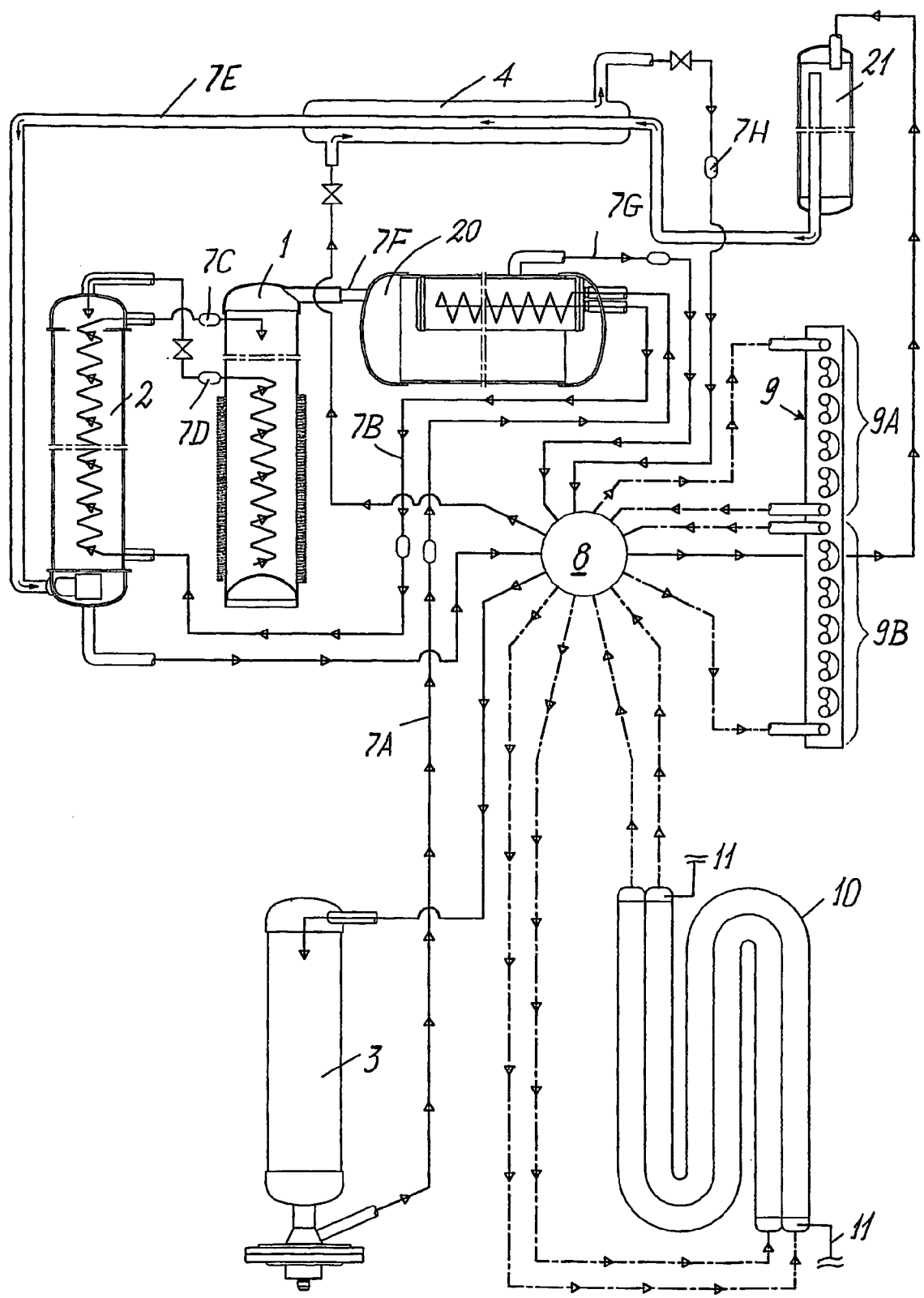
Figure 2:
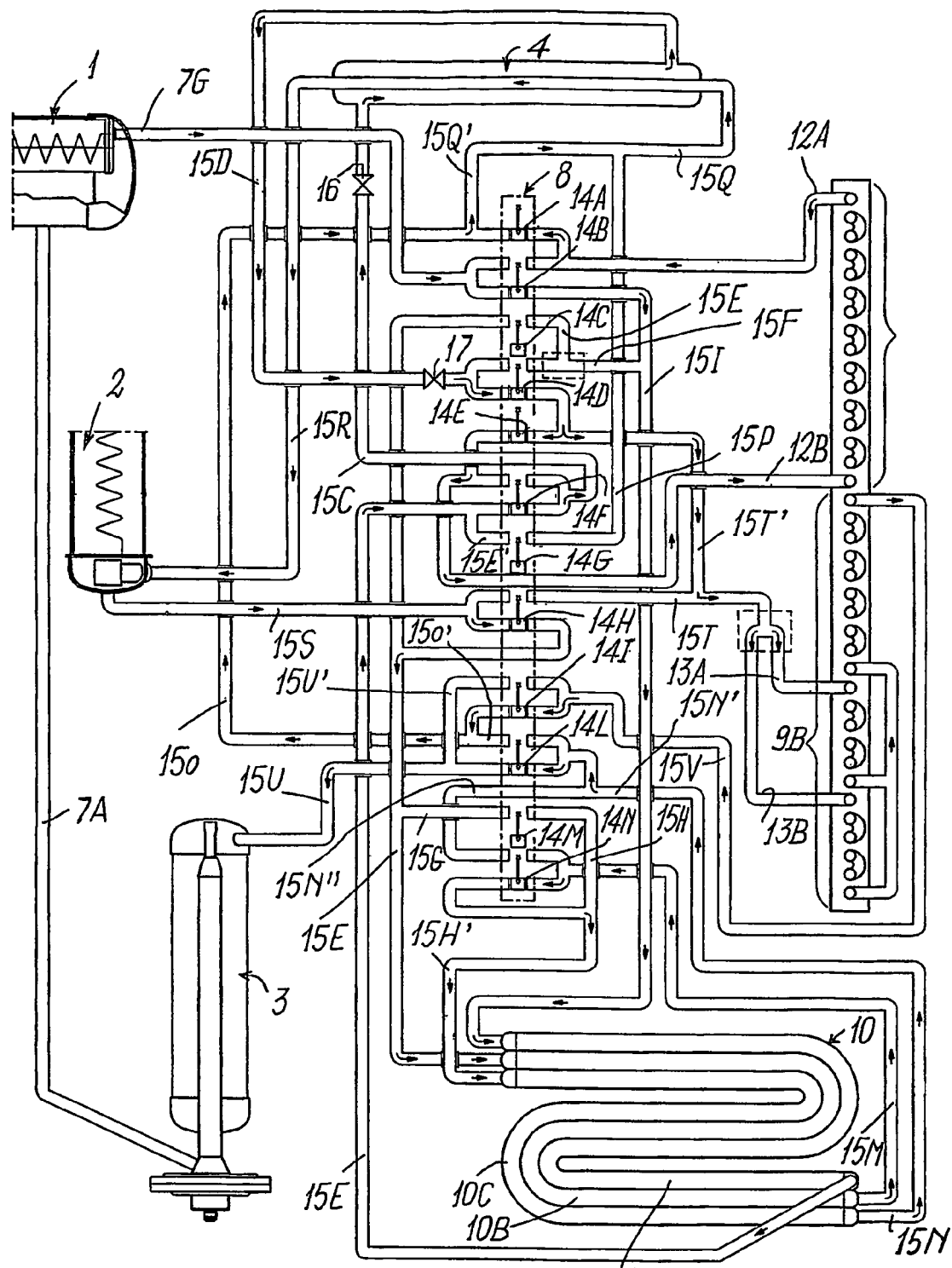
Figure 3:
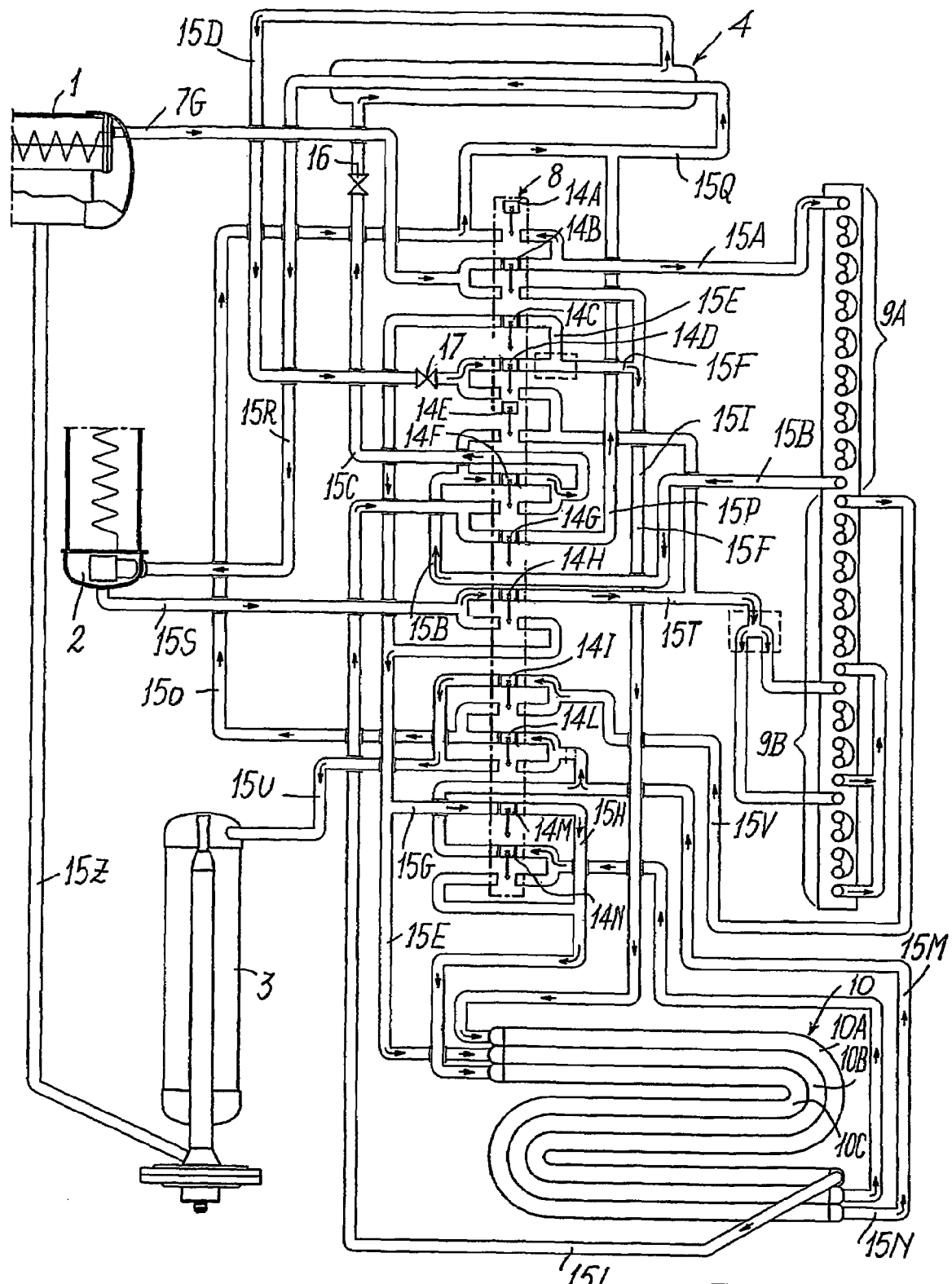

The present invention will be better understood from the accompanying drawings which are provided by way of non-limiting example and in which:

FIGS. 1A, B are a schematic view of the device showing operation in heating mode and in cooling mode respectively;

FIGS. 2 and 3 are a simplified schematic view showing the connections of the various components of the device when operating in heating mode and in cooling mode respectively.

With reference to said figures, these show a usual generator 1, a heat exchanger 2 of GAX type, a usual pump 3, a usual subcooler-recuperator 4, a usual rectifier 20 for the vapour prior to its entry into the condenser and a usual vessel 21 for checking the refrigerant concentration.

The said components and the relative connection circuit indicated overall by 7A–H are of conventional type and will therefore not be described in detail hereinafter. The device also comprises sixteen/fourteen way valve means and two heat exchange means 9 and 10 for changing a phase of the refrigerant solution circulating through the said means.

According to the invention, when the device operates in cooling mode (FIG. 3) the valve means 8 are arranged to modify the circuit which connects together the various components of the device such that the first heat exchange means 10 operates as an evaporator and the second 9 operates partly as a condenser and partly as an absorber; in contrast, when the device operates in heating mode the evaporator means are arranged to modify said circuit such that the first heat exchange means 10 operates partly as an evaporator and partly as an absorber, and the second 9 as an evaporator.

The heat exchange means 9 and 10 are of traditional type; preferably the heat exchange means 10 is of the fluid-liquid type and hence comprises a hydraulic circuit 11 (shown schematically in FIGS. 1A, 1B) to drive a liquid circulating through said circuit and passing through said heat exchanger. The hydraulic circuit will not be further described, being of traditional type. Preferably the heat exchanger 10 is of the type described in European application EP0911597, the description of which is to be considered as incorporated into the present text. The heat exchanger 10 comprises at least two tube bundles arranged to form two separate sub-heat exchangers 10A, B, C, presenting separate inlets and outlets. In one possible implementation of the invention the separate sub-heat exchangers 10A, B, C are three in number and are disposed side by side to form an "S". It should be noted that for optimum operation of the heat exchanger 10, each of its parts 10A–C must comprise a tube bundle with tubes having a diameter between 8 mm and 16 mm. In this respect it has been verified experimentally that such heat exchangers enable the useful passage cross-sections for the fluids passing through them to be balanced in order to optimize the hydraulic characteristics (circuit pressure drops) and thermodynamic characteristics (heat and mass transfer and phase change) in both the modes in which the heat exchangers are required to operate. In known appliances in which the cycle inversion takes place only between evaporator and condenser the refrigerant flow rate is identical in both heat exchangers, and the phase change is in the opposite sense but with very similar thermodynamic characteristics; in contrast, in the present invention the circuit inversion also involves the absorber, which has fluid flow rates and thermodynamic characteristics completely different from the evaporator and condenser.

The heat exchange means 9 is of the fluid-air type and hence comprises usual finning (not shown) for transferring to the surrounding air the thermal energy developed within the heat exchanger tubes. The heat exchanger 9 preferably comprises within a single bank two separate sub-heat exchangers 9A, B presenting separate connections indicated by 12A, B and 13A, B, C acting, in the manner explained hereinafter, and at the required time, as inlets or outlets for the solution circulating through the device.

Advantageously the inlets 13A are split to optimize pressure drops and fluid balancing when operating in cooling mode.

It should be noted that the heat exchanger 9 is constructed as a single bank for size and constructional reasons, but could be constructed as two or more usual separate banks. In the same manner the heat exchanger 9 could also be of fluid-liquid type even though such a solution would have the complication of having to provide for each sub-heat exchanger a hydraulic circuit for circulating the liquid which is to receive or give up the thermal energy developed or required during the phase changes which take place within said sub-heat exchangers.

From a functional schematic viewpoint the valve means 8 comprise twelve usual two or three-way valve members indicated by 14A–N, which can be of any known type able to work with a refrigerant solution circulating through a GAX device. These valve means could possibly be grouped into a single multi-way device.

With reference to FIG. 2, the operating cycle of the device when in heating mode is such that the refrigerant vapour leaving the branch 7G of the generator 1 via the valve 14B and the branch 15I reaches the inlet of the sub-heat exchanger 10A which in this operating mode operates as a condenser. The vapour condenses within this condenser and becomes liquid to generate heat which is transferred to the liquid circulating through the heat exchanger and through the hydraulic circuit 11 (FIG. 1A, B) connected to said condenser in order to be used for heating.

It should be noted that during this stage the valve 14C is also shifted so that the dead branches 15E and F can also be reached by the vapour.

The relatively hot pressurized liquid passes through the outlet branch 15E, the valve 14F, the branch 15C and the condensation valve 16 to reach the recuperator 4 in which, as described hereinafter, transfers heat to the vapour originating from the heat exchanger 9.

The refrigerant liquid then passes through the outlet branch 15D, the expansion valve 17, the valves 14D and E and the inlet branches 15E, F, T, T', 13A, B and 12A, to enter either the whole of the heat exchanger 9 or its part 9A or 9B. When in this operating mode this heat exchanger operates as an evaporator to convert the entering liquid into vapour and to cool the air circulating over the heat exchanger, i.e. to recuperate heat from the outside.

It should be noted that during this stage the valves 14G, H are also shifted so that the dead branches 15E' and 15T can also be reached by the liquid.

The relatively cold, low pressure vapour from the outlet branches 12A and 15V passes through the valves 14A, 14I and the branches 15O, Q, Q' to the recuperator 4 where it receives heat from the liquid originating from the condenser 10, and enters the heat exchanger 2 of GAX type via the outlet branch 15R.

It should be noted that during this stage the valves 14G and 14L are also shifted so that the dead branches 15P and 15O' can also be reached by the vapour.

From the GAX heat exchanger 2 the solution passes through the outlet branch 15S, the valves 14H and the branch 15E to enter the part 10B of the heat exchanger 10, and also passes through the outlet branch 15M, the valve 14N and the further branch 15H, H' to also enter the other part 10C of the heat exchanger. When in this operating mode these two heat exchanger parts 10B and 10C are in series and operate as an absorber, to transfer heat to the liquid circulating through the said heat exchangers 10B and 10C, which is used by the hydraulic circuit 11 for heating.

The absorber could instead comprise a single sub-heat exchanger 10B or 10C even though it has been found experimentally that two sub-heat exchangers positioned in series provide improved performance.

It should be noted that during this stage the valve 14M is also shifted so that the solution can also reach the dead branches 15H, G.

The solution finally passes through the outlet branch 15N', the valve 14L and the branch 15U to reach the pump 3, from which it passes through the branch 15Z to reach the generator 1. It should be noted that during this stage the dead branches 15N', N'' are also reached by the solution.

With reference to FIG. 3, the operating cycle of the device when in cooling mode is such that the refrigerant vapour leaving the generator through the branch 7G passes through the valve 14B to the inlet branch 15A of the sub-heat exchanger 9A which in this operating mode operates as a condenser. In this condenser the vapour is maintained under pressure and is cooled to become liquid. The vapour transfers heat to the air surrounding the condenser 9A. The relatively hot pressurized liquid leaves the condenser through the circuit branch 15B, and by way of the valve 14F, a valve 16 and the branch 15C reaches the recuperator 4 in which it transfers heat to the vapour originating from the other heat exchanger 10 (as described in detail hereinafter). From the recuperator 14 the liquid passes through the branch 15D, the expansion valve 17, the valves 14D, C and N, and the branches 15E–I, to reach the three inlets of the three sub-heat exchangers 10A–C of the second heat exchanger 10 which when in this operating mode all operate as evaporator. The pressure of the liquid leaving the recuperator 4 is lowered by the valve 17 and the liquid evaporates within the evaporator 10 to absorb heat and thus cool the liquid circulating through the evaporator 10 and through the hydraulic circuit 11 (FIGS. 1A, B) associated with the evaporator, so as to produce the desired cooling effect. The refrigerant vapour passes though the three outlets of the evaporator 10, the branches 15L–N, the valves 14G, N, L and the further branches 15O–Q to reach the recuperator 4 where it is heated and from which it enters the GAX heat exchanger 2 through the branch 15R. The weak solution leaving the GAX heat exchanger passes through its outlet branch 15S, the valve 14H and the branches 15T to reach the second sub-heat exchanger of the heat exchanger 9 which when in this operating mode operates as an absorber. During the absorption process the heat generated is transferred to the air circulating about the heat exchanger 9B. The solution leaving the absorber passes through the outlet branch 15V, the valve 14I and the further branch 15U to reach the pump, and from there returns to the generator 1 via a branch 15Z.

It should be noted that by suitable shifting (represented in FIG. 3) of the valves 14A–N all the dead branches of the circuit are always in communication with a branch in which the solution in one of its various phases circulates.

FIGS. 1A, B show schematically the connections of the generator 1, of the GAX heat exchanger 2, of the recuperator 4, of the rectifier 20 and of the vessel 21. These connections have not been described in the aforegoing description and are not shown in FIGS. 2 and 3. As they are of conventional type for the expert of the art, they are not described in detail hereinafter.

Figure 1B:
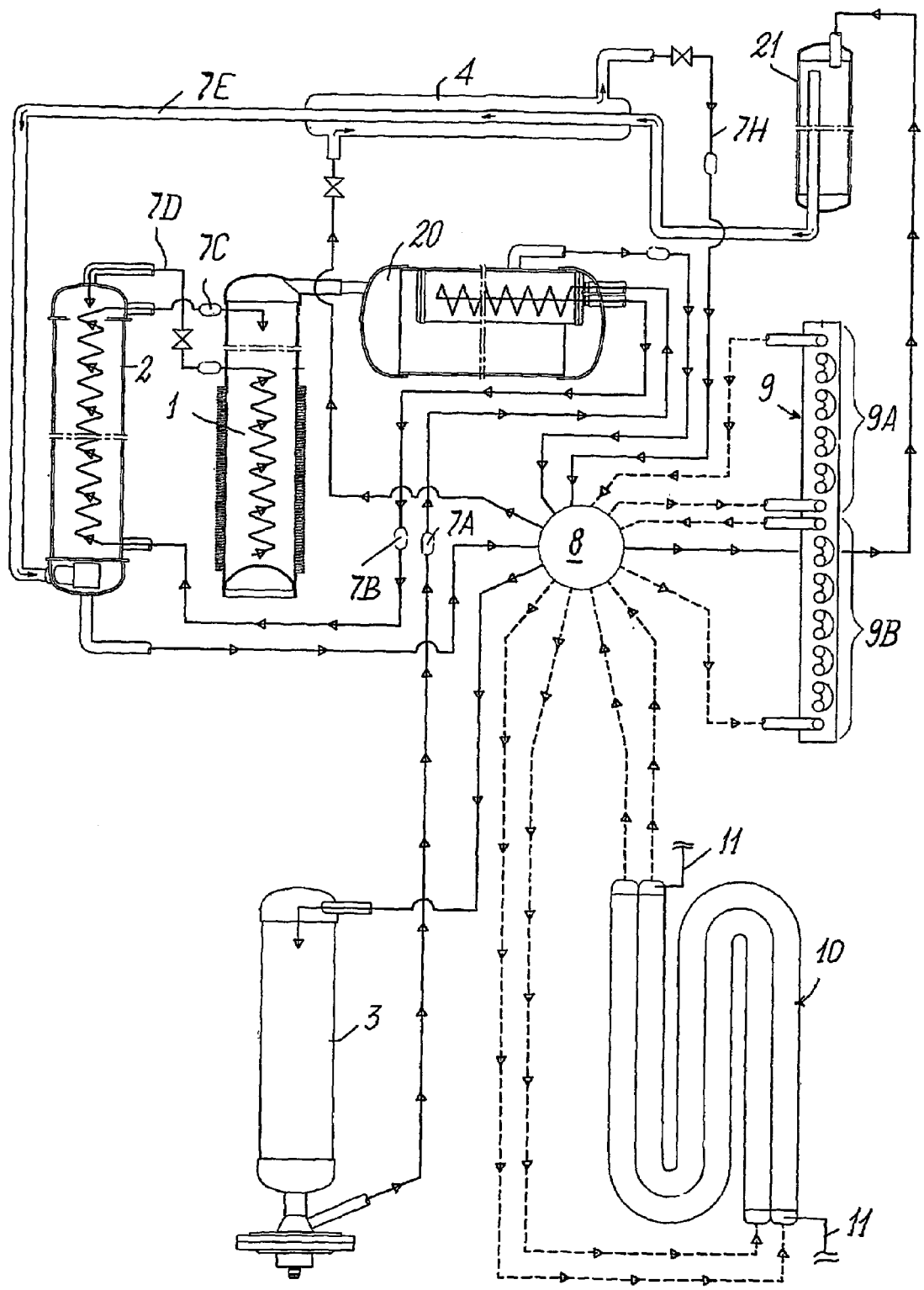

In FIGS. 1A and 1B the circuit flows which are common both to the heating stage and to the cooling stage are shown by full lines, the circuit flows relative to the heating stage are indicated by dashed and dotted lines (FIG. 1A) and the circuit flows relative to the cooling stage are indicated by dashed lines (FIG. 1B).

When the device of the invention is in heating mode the heat exchanger 9 can be defrosted. For this purpose, operation in heating mode is interrupted and for a predetermined time, for example four minutes, the device is made to operate in cooling mode. In this manner a high temperature solution is circulated through both parts 9A–B of the heat exchanger 9, to defrost the heat exchanger without the need to use external heat sources. This operation is also easier and quicker than that of the known art.

As the device of the invention comprises only two heat exchangers 9 and 10 which, depending on the operating mode, perform the three functions of evaporator, condenser and absorber, it is more compact and reliable. This arrangement also enables a single hydraulic circuit to be provided (FIGS. 1A, B) associated with the heat exchanger 10, for heating or cooling the liquid necessary to obtain the required operability of the device. In this manner the device is easier to handle and control and has a smaller number of components than the devices of the known art.

It should also be emphasized that the device of the invention comprises a hydraulic circuit with its valve members 14A–N controlled in such a manner that in no stage of its operation does it leave dead branches, i.e. branches not reached by the solution. Consequently, the circuit of the device requires a smaller number of overpressure members and in general of control means, which are simpler and of easier handling.

Finally, it should be noted that the aforedescribed embodiment is provided by way of example only, and that numerous variants are possible, all entering within the same inventive concept; thus for example the valve means 8 could consist of a plurality of different valve members instead of consisting of a single sixteen/fourteen-way valve.

The invention claimed is:

1. A cooling or heating device in an absorption heat pump of GAX type, comprising:
   a generator;
   a heat exchanger of GAX type;
   an absorber;
   a condenser;
   an evaporator;
   a pump connected to said absorber and generator;
   a first circuit for refrigerant solution circulating through the device and connecting together at least said generator, GAX heat exchanger, absorber, condenser, evaporator, and pump; and
   a valve device configured to modify said first circuit to vary a manner in which the absorber, condenser, and evaporator are connected together;
   at least a first and a second heat exchange means for enabling at least one phase of the refrigerant solution circulating through said first circuit to be changed and to enable thermal energy to be exchanged against an external fluid, said first and second heat exchange means each comprising at least first and second mutually separate sub-heat exchangers arranged to function either as an evaporator or as an absorber and condenser, depending on an operating mode of the device.

2. A device as claimed in claim 1, wherein when the device operates in a cooling mode, the valve device is configured to modify the first circuit such that the first heat exchange means operates as an evaporator, said first sub-heat exchanger of the second heat exchange means operates as a condenser and said second sub-heat exchanger of the second heat exchange means operates as an absorber, whereas when the device operates in a heating mode said valve device is configured to modify said first circuit such that said first sub-heat exchanger of the first heat exchange means operates as a condenser and said second sub-heat exchanger of the first heat exchange means operates as an absorber, and the second heat exchange means operates as an evaporator.

3. A device as claimed in claim 1, wherein the first and second heat exchange means comprise at least the first and second separate sub-heat exchangers that are only two in number.

4. A device as claimed in claim 1, further comprising a single hydraulic circuit for circulation of a liquid and configured to withdraw or receive thermal energy generated by the evaporator or by the condenser or by the absorber.

5. A device as claimed 1, wherein the first circuit through which the refrigerant solution circulates and the valve device are formed to avoid dead branches not reached by said refrigerant solution, in two operating modes of the device.

6. A device as claimed in claim 1, wherein in the second heat exchange means heat exchange takes place between the refrigerant solution and air circulating on an outside of said heat exchanger.

7. A device as claimed in claim 1, wherein in the second heat exchange means heat exchange takes place between the refrigerant solution and a circulating liquid both of which lie within said second heat exchange means.

8. A device as claimed in claim 7, wherein the second heat exchange means comprises a substantially tube-shaped casing having an inlet and an outlet for a first fluid, and a plurality of tubes disposed longitudinally in an interior of said casing; each tube being connected to an entry element and an exit element for a second fluid, the first fluid circulating within an interior of the casing in contact with outer solutions of said tubes; the tubes inside the casing being substantially directly in contact with each other and with the inner walls of said casing and having a cross-section to form within the casing a plurality of micro-channels parallel to the tubes for circulation of the first fluid.

9. A device as claimed in claim 8, wherein between entry and exit portions the tubes present at least one portion having a cross-section of shape different from that of adjacent tube portions, the shape being such as to at least partly break and remix the flow of fluid circulating through the tube, and portions of the tube having a cross-section of different shape being formed of telescope shape and/or being in contact with each other, to maintain the tubes spaced apart.

10. A device as claimed in claim 8, wherein the heat exchanger is of S shape, the casing housing the tubes comprising two semi-circular shells in correspondence with a curved portion.

11. A device as claimed in claim 7, wherein the second heat exchange means comprises three separate side-by-side sub-heat exchangers.

12. A device as claimed in claim 1, wherein the valve device includes a single valve comprising a plurality of valve members.

13. A device as claimed in claim 12, wherein the single valve is a sixteen/fourteen-way valve.

14. A method for controlling solution and/or refrigerant in a device claimed claim 1, using the at least first and second separate sub-heat exchangers of the at least first and second heat exchange means either as an evaporator or as an absorber and condenser, according to the operating mode of the device.

15. A method for controlling solution and/or refrigerant in a device claimed in claim 1, avoiding dead branches not reached by said solution and/or refrigerant, in two modes of operation of the device.

* * * * *